(12) United States Patent
Strode et al.

(10) Patent No.: US 8,726,184 B2
(45) Date of Patent: May 13, 2014

(54) SYSTEMS, APPARATUS AND METHODS FOR A MESSAGING SYSTEM

(75) Inventors: Ray Strode, Somerville, MA (US); Matthias Clasen, Acton, MA (US)

(73) Assignee: Red Hat, Inc., Raleigh, NC (US)

( * ) Notice: Subject to any disclaimer, the term of this patent is extended or adjusted under 35 U.S.C. 154(b) by 1222 days.

(21) Appl. No.: 11/947,262

(22) Filed: Nov. 29, 2007

(65) Prior Publication Data

US 2009/0144649 A1  Jun. 4, 2009

(51) Int. Cl.
*G06F 3/048* (2013.01)
*G06F 3/0481* (2013.01)
*G06F 1/32* (2006.01)
*G06F 3/0488* (2013.01)
*G06F 21/31* (2013.01)
*G06F 21/62* (2013.01)
*G06Q 10/10* (2012.01)

(52) U.S. Cl.
CPC ........ *G06F 3/0481* (2013.01); *G09G 2330/022* (2013.01); *G09G 2320/046* (2013.01); *G09G 2330/04* (2013.01); *G06F 1/3206* (2013.01); *G06F 3/04883* (2013.01); *G06F 21/31* (2013.01); *G06F 21/629* (2013.01); *G06F 21/6209* (2013.01); *G06F 2221/2149* (2013.01); *G06Q 10/10* (2013.01)
USPC ............ 715/780; 715/867; 715/751; 715/752

(58) Field of Classification Search
CPC ................. G09G 2330/022; G09G 2320/046; G09G 2330/04; G06F 1/3206; G06F 3/0481; G06F 3/04883; G06F 21/31; G06F 21/269; G06F 21/6209; G06F 2221/2149; Y02B 60/1289; G06Q 10/10
USPC .................................. 715/780, 867, 751, 752
See application file for complete search history.

(56) References Cited

U.S. PATENT DOCUMENTS

| | | | | |
|---|---|---|---|---|
| 5,778,053 A | * | 7/1998 | Skarbo et al. | 379/93.21 |
| 5,852,436 A | * | 12/1998 | Franklin et al. | 715/867 |
| 5,870,744 A | * | 2/1999 | Sprague | 709/229 |
| 6,111,517 A | * | 8/2000 | Atick et al. | 340/5.83 |
| 6,256,008 B1 | * | 7/2001 | Sparks et al. | 345/618 |
| 6,288,715 B1 | * | 9/2001 | Bain et al. | 345/211 |
| 6,633,318 B1 | * | 10/2003 | Kim et al. | 715/867 |
| 6,646,657 B1 | * | 11/2003 | Rouser | 715/741 |
| 7,596,768 B2 | * | 9/2009 | Nakayama | 715/867 |
| 7,689,939 B1 | * | 3/2010 | Becker | 715/867 |
| 2002/0196294 A1 | * | 12/2002 | Sesek | 345/867 |
| 2004/0041849 A1 | * | 3/2004 | Mock et al. | 345/867 |
| 2004/0073643 A1 | * | 4/2004 | Hayes et al. | 709/223 |
| 2004/0088356 A1 | * | 5/2004 | Sellen et al. | 709/205 |
| 2006/0090140 A1 | * | 4/2006 | Tung | 715/764 |
| 2006/0195802 A1 | * | 8/2006 | Nakayama | 715/867 |
| 2007/0028176 A1 | * | 2/2007 | Perdomo et al. | 715/741 |

* cited by examiner

*Primary Examiner* — Patrick Riegler

(74) *Attorney, Agent, or Firm* — Lowenstein Sandler LLP

(57) ABSTRACT

An embodiment relates generally to a method of messaging. The method includes providing a message activation widget on a lock dialog box of a screen saver application and activating the message activation widget. The method also includes displaying a message user interface configured to accept a message and displaying a screen saver image in response to saving an entered message in the message user interface.

18 Claims, 6 Drawing Sheets

SYSTEMS, APPARATUS AND METHODS FOR A MESSAGING SYSTEM

FIELD

This invention relates generally to messaging, more particularly, to systems, apparatus and methods for a messaging system executing on a host computer.

DESCRIPTION OF THE RELATED ART

Computers have become prevalent in government, business, and in the home. As often as user operate their respective computers, users will often be pulled away from their computers because of meetings, errands, or other events that require the presence of the users. For security reasons, users will often "lock" their computer with a screen saver application that prevents any subsequent user from accessing the locked computer. The screen saver application will also display a moving image on the monitor to prevent a burn-in condition.

A person in a typical organization may look for a user at his office (or cubicle, station, etc.). If the user is not there, the visiting person may leave a message on a notepad or write a message on an available message board such as a whiteboard or bulletin board.

Although leaving messages by hand can be a useful, there are drawbacks and disadvantages. For example, someone leaving a message on an adhesive note may lose the note because of a messy desk or the adhesive did not adhere to a surface. Another example can be someone may not leave a message on a full whiteboard. Accordingly, there is a need in the art for a mechanism to leave messages at a locked computer without the possibility of the message being lost or not being captured.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for a screen-saver message system. More specifically, a message module can be configured to interface with the lock dialog box of a screen saver application. The lock dialog box of the screen saver application appears on-screen to notify a user that the computer is locked when a user activates the mouse and/or keyboard. The message module can be configured to provide a user interface (UI) widget, e.g., a button, an icon, etc., on the lock dialog box. When the UI widget is activated, the message module can be configured to display a message entry UI. The message entry UI can be configured to provide a text entry section and, in some embodiments, a drawing entry section. The user can then enter a message in the text entry section, draw a figure in drawing entry section or combinations thereof. The user can then submit the entered message, which is then saved as a message bubble to the desktop of the host computer executing the screen saver application.

In some embodiments, a user leaving a message can be required to authenticate prior to leaving a message with the message module. In other embodiments, the message module can be configured to save audio and video messages from users if the host computer is equipped with the proper respective equipment.

Figure 1:
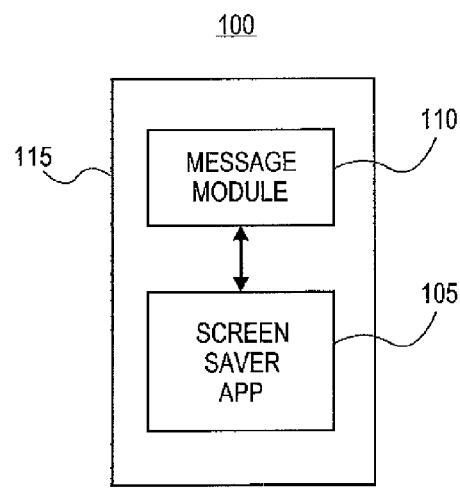
FIG. 1 depicts an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software programming languages (C, C++, Java, or other objected oriented languages), hardware components (processors, ASICs, PLA, etc.), or combinations thereof.

As shown in FIG. 1, the system 100 can comprise a screen saver application (labeled as "SCREEN SAVER APP") 105 coupled with a message module 110 executing on a host computer 115. The host computer 115 can be a personal computer, a laptop, a network client, terminal or other similar computing platform. The host computer 115 can be configured with a monitor, keyboard, mouse, disk drives, and other typical peripherals.

The host computer 115 can be configured to execute an operating system (not shown) such as Windows, Mac, Linux or other known operating systems (proprietary or open-source). The operating system can generally provide the application space and services for software applications and data and access to any attached peripherals of the host computer 110 such as a keyboard, mouse, disk drives, microphone, camera, etc.

The screen saver application 105 can be configured to provide a non-static image to display on a respective monitor to prevent a burn-in condition after a predetermined amount of inactivity on the host computer 115. The screen saver application 105 can also be configured to "lock" the host computer 115. When the computer is locked, the user of the host computer has to enter a password to unlock the computer. Accordingly, the screen save application 105 can provide a measure of security while the user is away from the host computer 115.

The screen saver application 105 can be coupled to a message module 110. More particularly, the message module 110 can be configured to provide a mechanism for the user of the host computer 115 to receive messages from visiting users, where multiple messages are stored cascaded on the desktop of the host computer 115. The message module 110 can be activated by a user interface widget (such as a button) on the lock dialog box of the screen saver application 105 as shown in FIG. 2.

Figure 2:
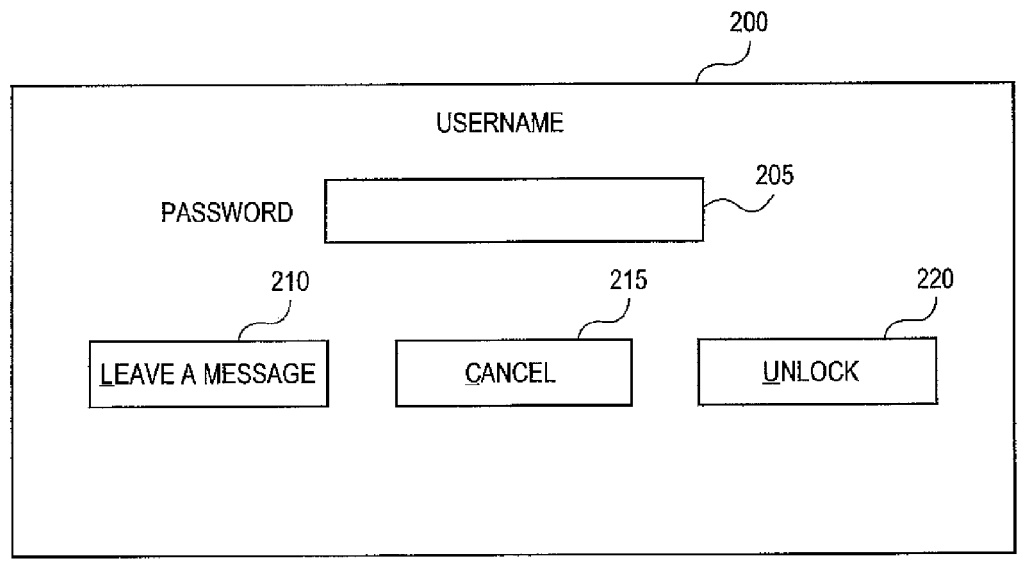
FIG. 2 illustrates an exemplary lock dialog box in accordance with another embodiment.

FIG. 2 illustrates an exemplar lock dialog box 200 in accordance with another embodiment. It should be readily apparent to those of ordinary skill in the art that the box 200 depicted in FIG. 2 represents a generalized schematic illustration and that other components may be added or existing components may be removed or modified.

As shown in FIG. 2, the lock dialog box 200 can be displayed in response to a user activating a keyboard and/or mouse of a locked host computer 115. The lock dialog box 200 can comprise a password entry box 205 and several widgets. The widgets can comprise a message button 210, a cancel button 215 and an unlock button 220. The password entry box 205 can be configured for a user to enter the password to unlock the host computer and to hibernate the screen saver application 105. The user can create the password to unlock the host computer 115 during the initial setup of the screen saver application 105.

The cancel button 215 can be configured for a user to cancel the process of either leaving a message or unlocking the computer. The screen saver application 105 can return to an active state of displaying a non-static image when the cancel button 215 is activated by clicking on the cancel button 215 with a mouse or by pressing the "c" key on the keyboard.

The unlock button 220 can be configured to unlock the host computer 115 and provide access to the host computer 115 when the correct password has been entered into the password entry box 205. The unlock button 205 can be activated by the mouse or by pressing the "u" key on the keyboard.

The message button 210 can be configured to provide a mechanism for a visiting user to leave a message. The message module 110 can be configured to generate a message user interface in response to activating the message button 210 by the mouse or by the "m" key of the keyboard. Examples of the message user interface are depicted in FIGS. 3 and 4.

Figure 3:
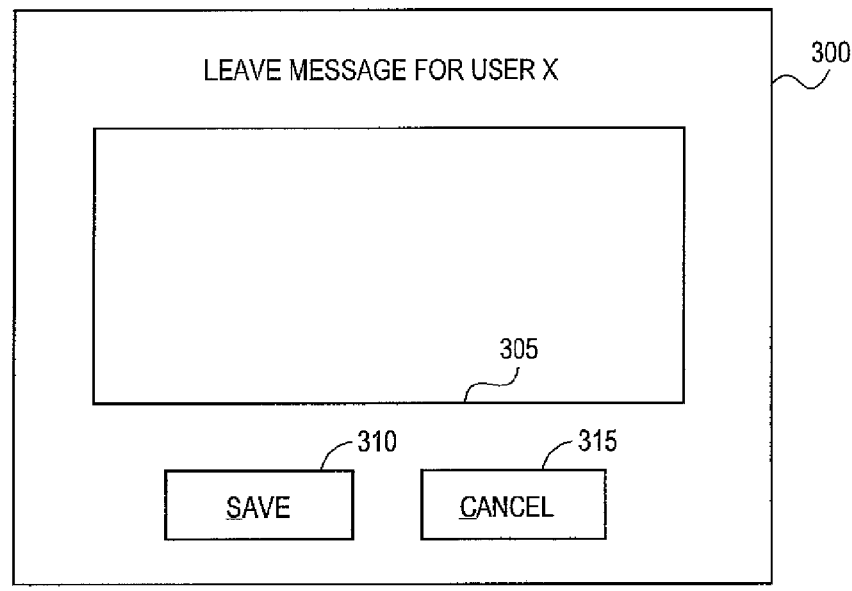
FIG. 3 depicts an exemplary graphical user interface in accordance with yet another embodiment.
Figure 4:
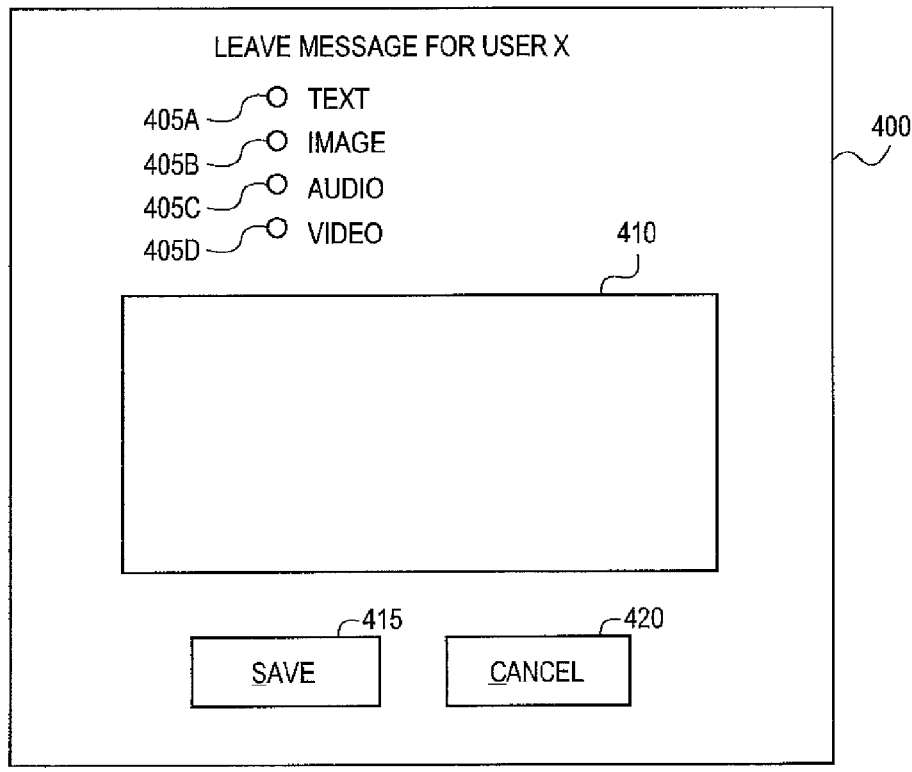
FIG. 4 illustrates another exemplary graphical user interface in accordance with yet another embodiment.

FIG. 3 illustrates an exemplary graphical interface (GUI) for the message user interface (UI) 300 in accordance with yet another embodiment. It should be readily apparent to those of ordinary skill in the art that the UI 300 depicted in FIG. 3 represents a generalized schematic illustration and that other components may be added or existing components may be removed or modified.

As shown in FIG. 3, the message UI 300 can comprise a message entry box 305, a save button 310 and a cancel button 315. The message entry box 305 can be configured to receive a message as entered on the keyboard of the host computer 115. The length of the message can be predetermined or user-determined.

The save button 310 can be configured to save the entered message in the message entry box 305 to a desktop of the operating system executing on the host computer (see FIG. 5) when activated by a mouse or the "s" key of the keyboard. The cancel button 315 can be configured to close the message UI 300 and discard any entered message in the message entry box 305 when activated by a mouse or the "c" key of the keyboard.

Other embodiments of the message module 110 can be configured with multiple mechanisms of leaving a message for the user of the host computer 115 as shown in FIG. 4, which illustrates an exemplary message UT 400 in accordance with yet another embodiment. It should be readily apparent to those of ordinary skill in the art that the message UI 400 depicted in FIG. 4 represents a generalized schematic illustration and that other steps may be added or existing steps may be removed or modified.

As shown in FIG. 45 the message UI 400 can comprise selector buttons 405A-D, each selector button associated with a message mechanism (text, image, audio, and video). The message UI 400 can also comprise an entry box 410, a save button 415, and a cancel button 420.

Selector buttons 405A-D provide a mechanism for a visiting user to select the type of message to leave for the user of the host computer 115. When the visiting user activates the selector button 405A for a text message by a mouse click, the entry box 410 can be configured to become a text entry box to receive a text message as entered by the visiting user through the keyboard. When the visiting user activates the selector button 405B for an image message by a mouse click, the entry box 410 can be configured to become an image entry box to allow the visiting user to draw an image with the mouse.

When the visiting user activates the selector button 405C for an audio message by a mouse click, the entry box 410 can be configured to become an audio entry box to allow a visiting user to record an audio message if the host computer 115 is equipped with a microphone.

When selector button 405C is activated by a mouse click, the entry box 410 can be configured to become a video entry box to allow a visiting user to record a video message if the host computer 115 is equipped with a video camera and microphone.

The save button 415 can be configured to save the entered message to the desktop of the host computer 115 when activated by a mouse click or the "s" key of the keyboard. The cancel button 420 can be configured to return to the screen saver application 105 and discard any entered message when activated by a mouse click or the "c" key of the keyboard.

Figure 5:
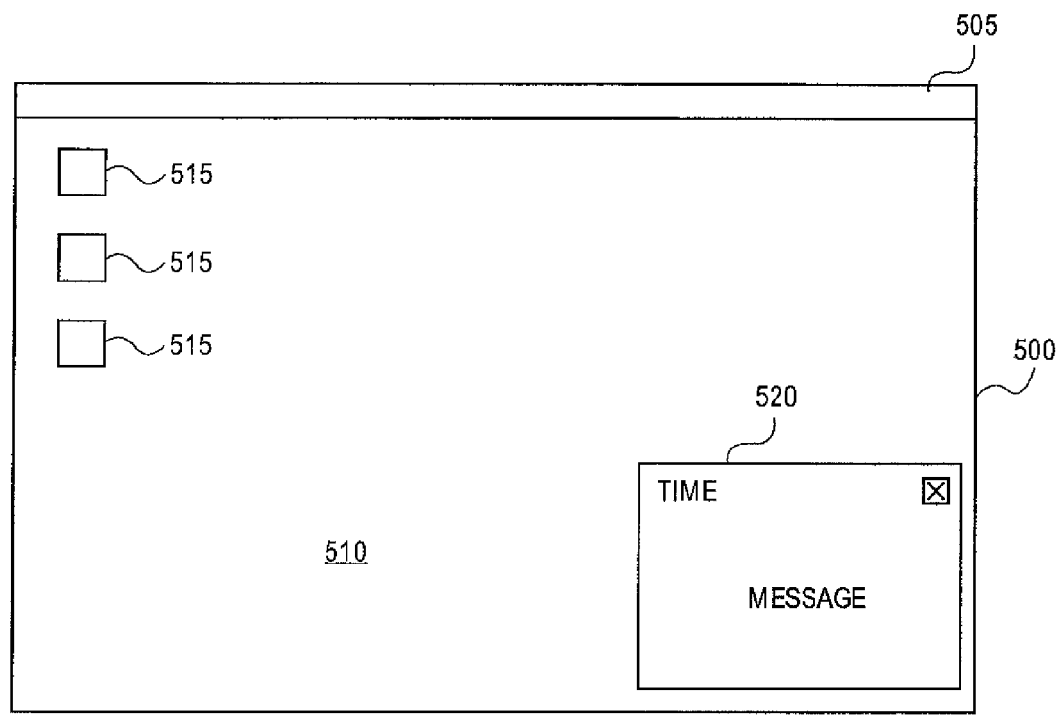
FIG. 5 shows yet another graphical user interface in accordance with yet another embodiment.

From either message UI 300 or 400 shown in FIGS. 3 and 4 respectively, once the save button 310, 415 is activated, the entered message can then be saved to the desktop of the host computer 115, as depicted in FIG. 5, which shows an exemplary saved message accordance with yet another embodiment.

As shown in FIG. 5, the desktop 500 can comprise a menu bar 505, desktop area 510, icons 515, and a message bubble 520. The menu bar 505 can be configured to provide access to applications, services, etc. through a menu system. The desktop area 510 can provide an area for user to work on applications and/or data. The icons 515 can represent software applications, data, services, etc. The icons 515 can represent a shortcut to a desired application and/or function.

The message bubble 520 can represent the saved message from the message UI 300 or 400. In some embodiments, multiple messages can be stacked upon on another. The format of the message bubble 520 can be user-determined.

Figure 6:
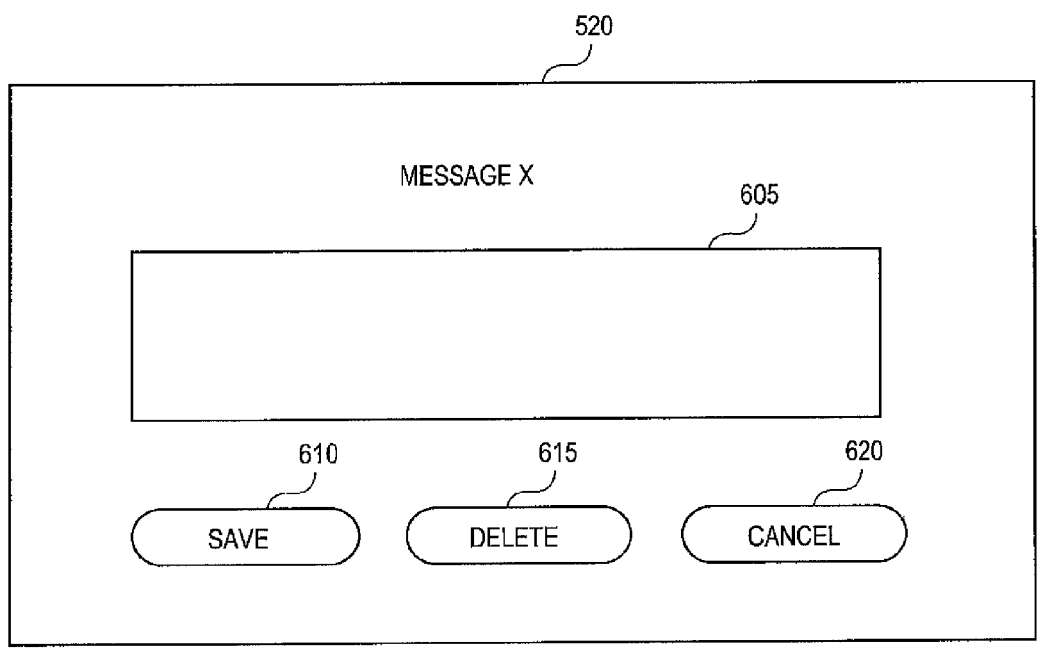
FIG. 6 illustrates an yet another exemplary graphical user interface in accordance with various embodiments.

FIG. 6 shows a more detailed view of the message bubble UI 520 in accordance with various embodiments. It should be readily apparent to those of ordinary skill in the art that the message UI 520 depicted in FIG. 6 represents a generalized schematic illustration and that other steps may be added or existing steps may be removed or modified.

As shown in FIG. 6, the message bubble UI 520 can include a message text box 605, a save button 610, a delete button 615 and a cancel button 620. The message text box 605 can comprise of the message that was entered through message UI 300 or 400 as previously described. The save button 610 can be configured to save the message to persistent storage device when activated by a peripheral. The delete button 615 can be configured to delete the message bubble 520 when activated by a peripheral. The cancel button 620 can be configured to minimize the message bubble 520 onto the desktop 510 when activated by a peripheral.

Figure 7:
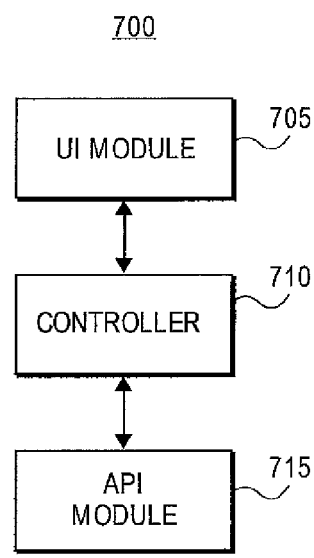
FIG. 7 shows an exemplary block diagram in accordance with yet another embodiment.

FIG. 7 depicts an exemplary block diagram 700 of the message module 110 in accordance with yet another embodiment. It should be readily apparent to those of ordinary skill in the art that the block diagram 700 depicted in FIG. 7 represents a generalized schematic illustration and that other components may be added or existing components may be removed or modified.

As shown in FIG. 7, the message module 110 can comprise a controller 705 coupled with a user interface (labeled as "UI") module 710 and coupled to an application program interface (labeled as "API") module 715. The controller 705 can be configured to provide the functionality of the message system as previously described and described in farther detail below.

The UI module 710 can be configured to generate the message UI 300 or 400 in response to an activation of the message button 210 on the lock dialog box 200. The API module 715 can be configured to provide an interface between the controller 705 with the screen saver application 105. More particularly, the API module 715 can detect the activation of the message button 210 on the lock dialog box 200.

It should be readily obvious to one of ordinary skill in the art that the functionality of the UI module 710 and the API module 715 can be merged in the controller 705 or the entire message module 110 be merged into the screen saver application 105 without departing from the scope of the various embodiments.

Figure 8:
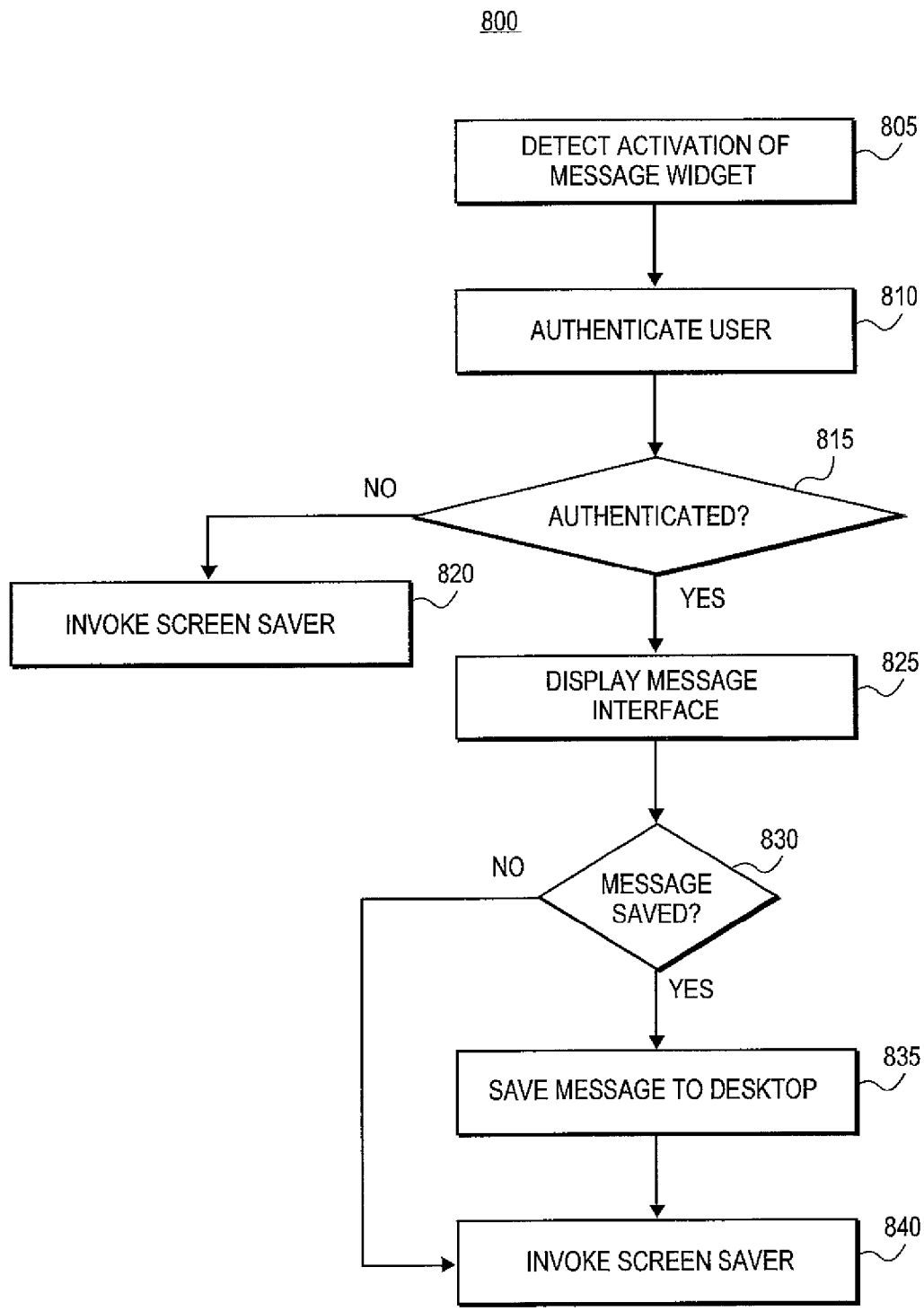
FIG. 8 depicts an exemplary flow diagram in accordance with yet another embodiment.

FIG. 8 depicts an exemplary flow diagram 800 for the message module 110 in accordance with yet another embodiment. It should be readily apparent to those of ordinary skill in the art that the flow diagram 800 depicted in FIG. 8 represents a generalized schematic illustration and that other steps may be added or existing steps may be removed or modified.

As shown in FIG. 8, the controller 705 of the message module 110 can be configured to detect the activation of the message button 210 on the lock dialog box 200. More particularly, the API module 715 can be configured to receive the event of the activation of the message button 210.

In step 810, the controller 705 can be configured to invoke the UI module 710 to display/generate an authentication user interface for a visiting user to authenticate. If the visiting user cannot authenticate, in step 815, the controller 705 can be configured to return to the lock dialog box 200, in step 820. Otherwise, if the visiting user authenticates, the controller 705 can be configured to display the message UI 300 or 400, in step 825.

In step 830, the controller 705 can be configured to wait for the activation of the save button 310 or 415 or the cancel button 315 or 420. More particularly, a user can enter a message in the text entry box 305 or entry box 410. If the visiting user activates the save button 310/415, in step 830, the controller 705 can be configured to save the entered message on the desktop of the host computer 115, in step 825. Subsequently, the controller 705 can invoke the screen saver application 105 and lock the host computer, in step 840. Otherwise, if the visiting activates the cancel button 315/420, in step 830, the controller 705 proceeds to the processing of step 840.

Figure 9:
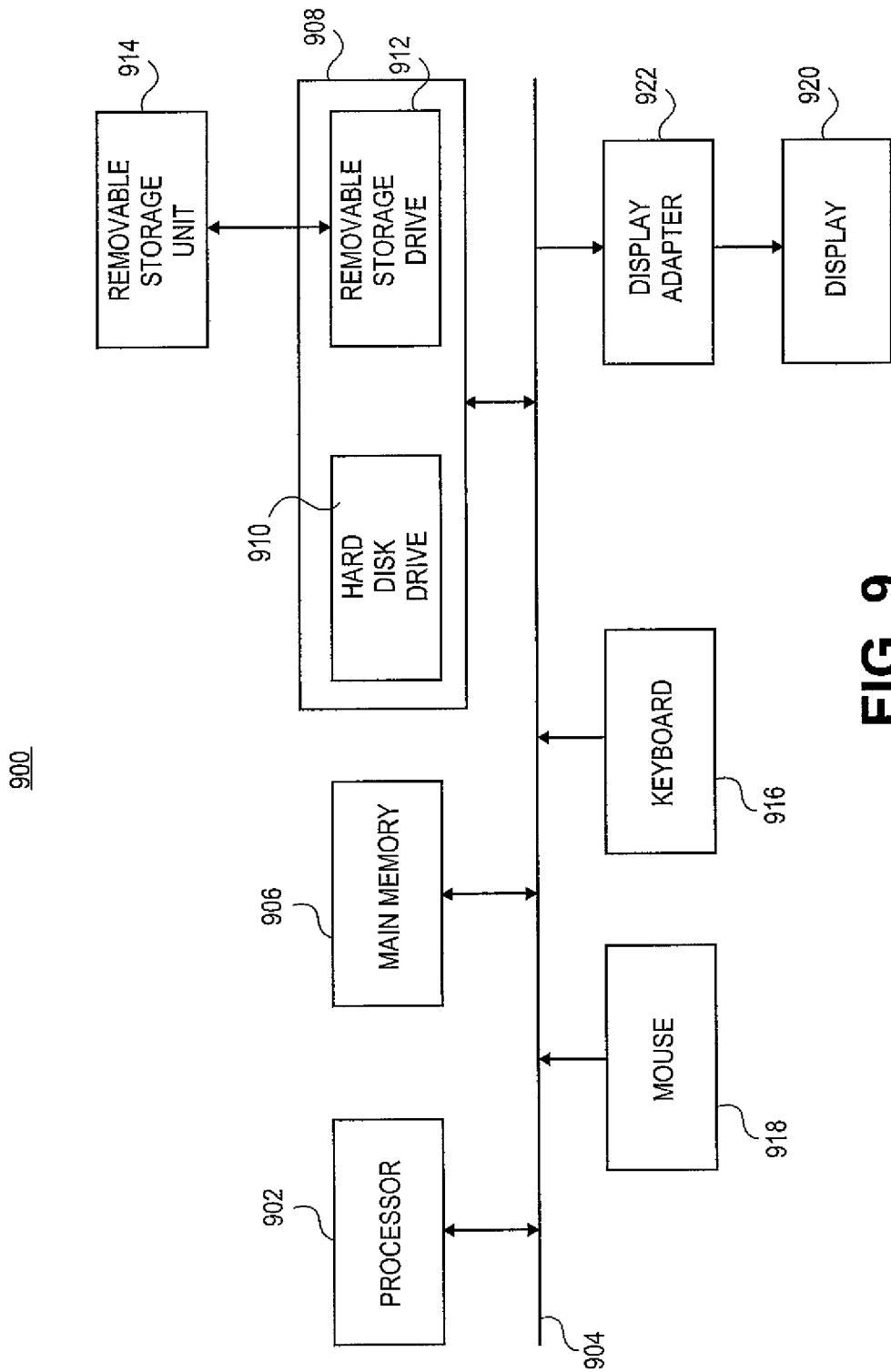
FIG. 9 depicts an exemplary computing platform in accordance with yet another embodiment.

FIG. 9 illustrates an exemplary block diagram of a computing platform 900 where an embodiment may be practiced. The functions of the message module 110 may be implemented in program code and executed by the computing platform 900. The message module 110 may be implemented in computer languages such as PASCAL, C, C++, JAVA, etc.

As shown in FIG. 9, the computer system 900 includes one or more processors, such as processor 902 that provide an execution platform for embodiments of the message module 110. Commands and data from the processor 902 are communicated over a communication bus 904. The computer system 00 also includes a main memory 906, such as a Random Access Memory (RAM), where the message module 110 may be executed during runtime, and a secondary memory 908. The secondary memory 908 includes, for example, a hard disk drive 910 and/or a removable storage drive 912, representing a floppy diskette drive, a magnetic tape drive, a compact disk drive, etc., where a copy of a computer program embodiment for the message module 110 may be stored. The removable storage drive 912 reads from and/or writes to a removable storage unit 914 in a well-known manner. A user interfaces with the message module 110 with a keyboard 916, a mouse 918, and a display 920. The display adapter 922 interfaces with the communication bus 904 and the display 920. The display adapter 922 also receives display data from the processor 902 and converts the display data into display commands for the display 920.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
    displaying, by a processor on a computer system of a user, a lock dialog box of a screen saver application, wherein the lock dialog box comprises a message activation widget;
    displaying an authentication user interface in response to a selection of the message activation widget, wherein the computer system is locked;
    receiving a log-in identification and a credential of a visiting user via the authentication user interface;
    displaying a message user interface in response to a successful authentication of the log-in identification and credential of the visiting user, wherein the message user interface is to accept a message and wherein the message user interface comprises a first option to accept the message as an audio message, a second option to accept the message as a text message, a third option to accept the message as an image message, and a fourth option to accept the message as a video message;
    displaying an audio entry box on the message user interface when the first option is selected, displaying a text entry box on the message user interface when the second option is selected, displaying an image entry box on the message user interface when the third option is selected, and displaying a video entry box on the message user interface when the fourth option is selected; and
    saving the message entered in the message user interface on a desktop of the computer system.

2. The method of claim 1, further comprising:
    receiving the text message via the text entry box displayed on the message user interface.

3. The method of claim 1, further comprising:
    receiving the image message via the image entry box displayed on the message user interface.

4. The method of claim 1, further comprising:
    receiving the audio message via the audio entry box displayed on the message user interface.

5. The method of claim 1, further comprising:
    receiving the video message via the video entry box displayed on the message user interface.

6. The method of claim 1, further comprising:
    authenticating the received log-in identification and the credential of the visiting user.

7. An apparatus comprising:
    a processor to execute a screen saver application and a manager module,
    wherein the screen saver application is to:
        lock a host computer and display a screen saver image; and generate a lock dialog box comprising a user interface widget in response to input from one of a mouse and a keyboard;
    and wherein the manager module is to:
    display an authentication user interface in response to a selection of the user interface widget;
    display a message user interface in response to a successful authentication of a log-in identification and a credential of a visiting user entered in the authentication user interface, wherein the message user interface comprises a first option to accept the message as an audio message, a second option to accept the message as a text message, a third option to accept the message as an image message, and a fourth option to accept the message as a video message;
    display an audio entry box on the message user interface when the first option is selected, display a text entry box on the message user interface when the second option is selected, display an image entry box on the message user interface when the third option is selected, and display a video entry box on the message user interface when the fourth option is selected; and
    save the message in the message user interface on a desktop of the computer system.

8. The apparatus of claim 7, wherein the message user interface receives the text message via the text entry box displayed on the message user interface.

9. The apparatus of claim 7, wherein the message user interface receives the image message via the image entry box displayed on the message user interface.

10. The apparatus of claim 7, wherein the message user interface receives the audio message via audio entry box displayed on the message user interface.

11. The apparatus of claim 7, wherein the message user interface receives the video message via video entry box displayed on the message user interface.

12. The apparatus of claim 7, wherein the authentication user interface is to accept the log-in identification and the credential of the visiting user.

13. A non-transitory computer readable storage medium comprising instructions to cause a processor to perform operations comprising:
    displaying, by the processor on a computer system of a user, a lock dialog box in response to input from one of a mouse and a keyboard, wherein the lock dialog box comprises a user interface widget;
    displaying an authentication user interface in response to a selection of the user interface widget, wherein the computer system is locked;
    receiving a log-in identification and a credential of a visiting user via the authentication user interface;
    displaying a message user interface to accept a message in response to a successful authentication of the log-in identification and credential of the visiting user, wherein the message user interface comprises a first option to accept the message as an audio message, a second option to accept the message as a text message, a third option to accept the message as an image message, and a fourth option to accept the message as a video message;
    displaying an audio entry box on the message user interface when the first option is selected, displaying a text entry box on the message user interface when the second option is selected, displaying an image entry box on the message user interface when the third option is selected, and displaying a video entry box on the message user interface when the fourth option is selected; and
    saving the message entered in the message user interface on a desktop of the computer system.

14. The non-transitory computer readable storage medium of claim 13, wherein the operations further comprise:
    receiving the text message via the text entry box displayed on the message user interface.

15. The non-transitory computer readable storage medium of claim 13, wherein the operations further comprise:
    receiving the image message via the image entry box displayed on the message user interface.

16. The non-transitory computer readable storage medium of claim 13, wherein the operations further comprise:
    receiving the audio message via the audio entry box displayed on the message user interface.

17. The non-transitory computer readable storage medium of claim 13, wherein the operations further comprise:
    receiving the video message via the video entry box displayed on the message user interface.

18. The non-transitory computer readable storage medium of claim 13, wherein the operations further comprise authenticating the log-in identification and the credential of the visiting user.

* * * * *